March 24, 1959 H. BLACKSTONE 2,878,713

OPTICAL SCANNER FOR DETERMINING VELOCITY-ALTITUDE

Filed Jan. 7, 1955

INVENTOR
HENRY BLACKSTONE

BY Mitchell & Bechert
ATTORNEYS 2,878,713
Patented Mar. 24, 1959

2,878,713

OPTICAL SCANNER FOR DETERMINING VELOCITY-ALTITUDE

Henry Blackstone, Northport, N.Y., assignor to Servo Corporation of America, New Hyde Park, N.Y., a corporation of New York Application January 7, 1955, Serial No. 480,436
12 Claims. (Cl. 88—1)

My invention relates to optical scanning devices particularly adapted to aerial reconnaissance and like operations, and this application incorporates improvements and modifications over the disclosure in copending application Serial No. 444,990, filed July 22, 1954, in the name of Henry Blackstone.

It is an object of the invention to provide an improved device of the character indicated.

It is another object to provide, in conjunction with scanners of the character indicated, means whereby the velocity-altitude function of the aircraft can be readily ascertained.

It is another object to achieve the above objects with a structure requiring relatively little additional complexity over existing scanners and which may be readily adapted to existing scanners.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figures 1, 2, 3, 4, 5:
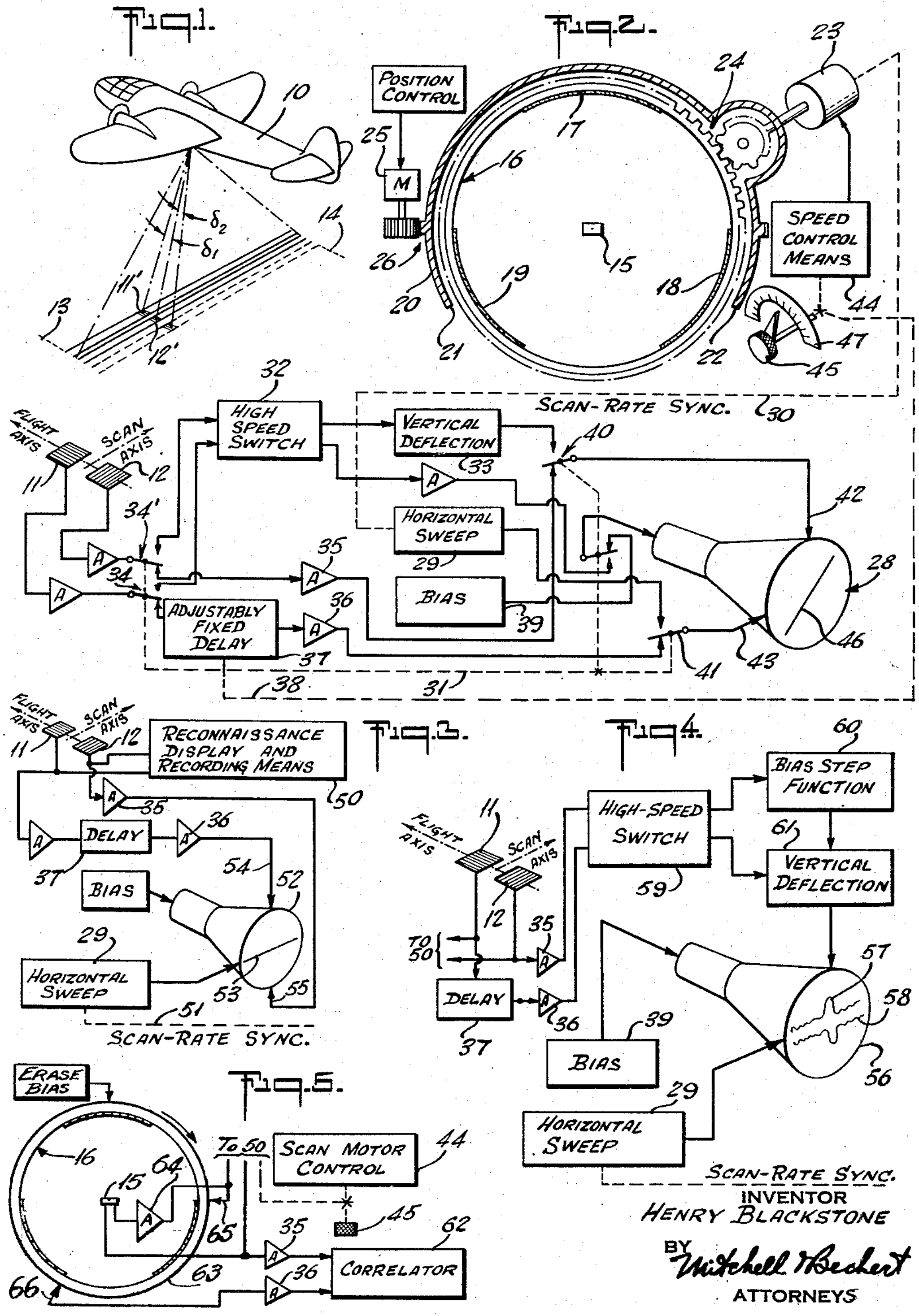
Fig. 1 is a simplified view in three-quarter rear perspective of an aircraft carrying equipment of the invention, and scanning the terrain beneath.
Fig. 2 is a view schematically indicating mechanical, optical, and electrical components of a scanner and computer incorporating features of the invention.
Figs. 3, 4, and 5 are fragmentary views illustrating modifications of certain parts of the arrangement of Fig. 2.

Briefly stated, my invention contemplates the application of simplified correlating techniques to separate video outputs developed by two or more energy-responsive elements in a scanner of the character indicated. The video output of one element is delayed with respect to that of the other, and means are provided for selectively varying the rate of scan until correlation is achieved. Upon achievement of correlation, the adjustment necessary to achieve correlation may be noted and may be direct-reading in terms of the velocity-altitude function (or v./h. rate) of the aircraft.

Referring to Fig. 1 of the drawings, my invention is shown in application to an airborne scanner, such as carried by the aircraft 10. Such a scanner may have a plurality of energy-responsive elements effectively spaced in the direction of the flight axis and including optical means for imaging said elements on the terrain beneath. The images of two such energy-responsive elements 11—12 are shown at 11′—12′ in Fig. 1. The optical means of the scanner may be mounted for continuous movement so as to laterally sweep the images 11′—12′ with respect to the flight axis, as between the limits 13—14 in Fig. 1. For the element spacings determining the images 11′—12′ in Fig. 1, the effective angular separation between elements 11—12, in the sense of the flight axis, is designated by the angle $\delta_1$.

The scanner itself may be one of several previously described types, and at the upper-right part of Fig. 2 I show basic elements of the scanner described in greater detail in copending patent application Serial No. 320,272, filed November 13, 1952, in the names of Henry Blackstone and Frank G. Willey. Such a scanner may comprise means, such as a cell or capsule 15, having a suitably transparent window and supporting the two energy-responsive elements 11—12 on the axis of rotation of a scanner drum 16. In order to provide efficient utilization of the mechanical cycle of the drum 16, we provide a plurality of substantially duplicate optical systems 17—18—19 in equal angularly spaced relation about the drum and carried for rotation therewith. A shield 20 (not rotated about the scan axis) substantially encompasses the scanner drum and optical elements 17—18—19, except for a window or opening defined between limits 21—22. In the form shown, the optical elements 17—18—19 are mirrors of width substantially equal to the spacing between mirrors, and the arrangement is such with respect to the opening 21—22 that at any one time only one mirror, as, for example, the mirror 17 in Fig. 2, is allowed to collect energy for focus on the elements of cell 15. To complete the structure, a continuously running motor 23 may drive the drum 16, as by edge-drive gear 24; and a suitably controlled positioning motor 25 may be connected to the entire scanner and shield 20, as by the edge-drive gears 26, in order to position the entire scanner about a vertical axis, as for adjustment to correct for the instantaneous drift in the heading of the aircraft.

As indicated generally above, my computer is directly applicable to existing scanning and display devices, as of the reconnaissance type disclosed in said copending application Serial No. 320,272. For this purpose, a display may be created on a cathode-ray oscilloscope 28, supplied by suitable signal-processing means responsive to the video outputs of elements 11—12 and employing horizontal-sweep means 29 synchronized with the basic scan rate, as suggested by the dashed-line connection 30. In the form of Fig. 2, I happen to have shown an arrangement in which the same display device 28 may be employed, not only for the reconnaissance display described in greater detail in said copending application Serial No. 320,272, but selectively also for other novel purposes achieved by the invention. All switch connections happen to be shown selecting the function of the invention, but it will be understood that when the switches, which may be ganged, as suggested by the dashed connection 31, are thrown to the other position, the reconnaissance display may be created. The reconnaissance display may employ a high-speed switch 32 alternately sampling the video outputs of elements 11—12 and, through vertical-deflection means 33, creating on the face of tube 28 separate intensity-modulated spaced lines, one for each element and for each scan.

For purposes determining v./h. in accordance with the invention, the switches may be positioned as shown in Fig. 2. Thus positioned, use is again made of the video outputs of both energy-responsive elements 11—12. In these circumstances, the switches 34—34′ are shown supplying the video signals of elements 11—12 to two channels, denoted by respective amplifiers 35—36. The only difference between treatment of video signals appearing in channels 35—36 is a relative time delay, achieved in the form shown by placement of adjustable delay means 37 in the channel of which amplifier 36 forms a part. Manual means may select the delay achievable by the means 37 and appropriate, for example, to different ranges of velocity-altitude function to be observed, but in the form shown I indicate my preference for a definite relation of this delay to the speed of scan motor 23, Basically, in Fig. 2 the trailing scan line as developed by the response of element 12 during a first scan is subject to delay at 37 before supply to channel 35, while the video output of the other cell element 11 for the next succeeding scan line is supplied to channel 36 without delay. The delay achieved by means 37 must be equivalent to the time between successive scans, or rather to the scan period, and therefore I show at 38 a mechanical interconnection between the manual control 45 for the means 44 which governs scan speed.

For the type of correlation display employed in Fig. 2, a uniform-intensity spot is created by bias means 39, and the outputs of the respective channels 35—36 are connected, on the one hand, by a switch 40 and, on the other hand, by switch 41 to mutually perpendicular deflection systems 42—43 of the cathode-ray device 28.

In use, the delay means 37 is always set to delay by one period of the scanning cycle regardless of the scan rate. Thus, by manipulating the control 45 until a straight-line display 46 is noted at 28, one may adjust the period of scan action until the video developed by cell element 12 exactly matches that developed by cell element 11, meaning that the same line on the ground (as viewed by different elements 11—12) is being displayed. When this occurs, the setting of the knob 45 is a direct reflection of the velocity altitude function of the aircraft.

If the amplification levels in the two channels 35—36 are the same, and if the deflection systems 42—43 are respectively vertical and horizontal, the line 46 will appear inclined at 45° when correlation is achieved. In the absence of correlation, spot traces on the face of tube 28 will be at random, and the straight-line display will be approached only as correlation is approached. Upon achievement of correlation, it is only necessary to note the setting of knob 45, as against a scale 47, for a particular setting of knob 38, in order uniquely to determine the instantaneous v./h. or velocity-altitude function of the aircraft.

Figs. 3 and 4 show slight modifications in the means for creating the display for which correlation is to be observed. In the arrangement of Fig. 3, the two elements 11—12 happen to be shown continuously connected to reconnaissance-display and recording means 50, synchronized (as indicated at 51) with the instantaneous scan rate developed by motor 23. The two channels 35—36 and the display means 37 may be as previously described, but the display on cathode-ray tube 52 is such as to develop or to approach the development of a horizontal line 53 when correlation is achieved. This may, of course, be done by merely rotating the deflection systems 42—43 of Fig. 2 to the extent of 45 degrees clockwise from the position shown in Fig. 2; but in Fig. 3, the horizontal line 53 is created by employment of a horizontal sweep (such as the sweep circuit 29 used for the reconnaissance display) and by applying the two channels to be correlated to opposite poles of the vertical-deflection system, as schematically suggested by connections at 54—55. It will be clear that, in the absence of correlation, the spot trace on tube 52 will not be a straight line, but will be a random development periodically traversing the horizontal axis of the tube and that, upon achievement of correlation, a straight line of maximum definition will be attained or approached.

In Fig. 4, the arrangement is generally the same as in Fig. 3 so that corresponding parts have been given the same reference numerals. The only difference is that in Fig. 4 the display on tube 56 presents two A-scope developments of opposite polarity, the A-scope display 57 being identified, for example, with the video output of channel 35 and the A-scope 58 being identified with the output of channel 36. In the form shown, dual A-scope presentations 57—58 are created by employing a high-speed switch 59 alternately sampling the video outputs of channels 35—36; and, by means of a suitably poled and biased step-function generator 60, the vertical-deflection circuit 61 develops deflection voltages presenting the respective displays 57—58 not only with opposite polarity, but also suitably displaced from one another to avoid ambiguity of identification, as will be understood.

In Fig. 5, I show a further modification in which the delay for the delayed video signal is achieved automatically, regardless of variation in scan rate by reason of adjustment at 45. This may be done by providing a ring 63 of magnetic or other storage means around or driven in synchronism with the scanner 16. The undelayed video signal is supplied direct to channel 35 as previously described. On the other hand, the video to be delayed is preamplified at 64 and applied via recording head 65 to the storage drum on ring 63. One full optical cycle later, that is, 120 degrees away, for the case of the three-mirror system shown, a head 66 picks off the delayed video for application to channel 36. Correlation is observed at 62 upon variation of the single control 45, and the v./h. rate is available by noting the resulting setting of control 45.

It will be clear that I have disclosed a simplified means for deriving the velocity-altitude function of an aircraft. When such aircraft is equipped with an optical-scanning device as of the specific character herein disclosed, the additional circuitry to derive v./h. information is relatively small. Nevertheless, the accuracy with which the function may be derived may be adequate for purposes of correctly setting the reconnaissance display and for setting other instruments in the aircraft.

While I have described the invention in detail for the preferred forms shown, it will be understood that modifications may be made within the scope of the invention as defined in the claims which follow.

I claim:

1. In combination, two energy-responsive elements, a scanner including optical means for causing the image of said elements to traverse a longitudinal-movement axis in a regularly recurrent scanning pattern, the images of said elements being longitudinally spaced, means for progressing said elements and said scanner in the longitudinal direction, whereby said elements are caused to scan longitudinally spaced lines in a field of view for successive operations of said scanner, and correlating means including means for controlling the period of scan action and for variably delaying the response of one element on one scan with respect to the response of the other element on another scan to achieve correlation between said responses, whereby, upon identification of the delay necessary to achieve correlation, there may be identified that angular rate at which a given object in the field of view is being longitudinally traversed by longitudinal movement of said elements as aforesaid.

2. In an airborne scanner of the character indicated, two energy-responsive elements, optical means for causing the images of said elements to scan laterally of the flight axis, the images of said elements being spaced in the sense of the flight axis; and correlating means responsive, on the one hand, to the video output of one of said elements during one scan and, on the other hand, to the video output of the other of said elements on another scan, said correlating means including means for varying the period of scan action and for variably delaying one of said outputs with respect to the other until correlation between said outputs is achieved; whereby, upon making the adjustment necessary to achieve correlation, the velocity-altitude function of the aircraft may be truly determined.

3. A scanner according to claim 2, in which said correlating means comprises a cathode-ray oscillograph having mutually perpendicular deflection systems, one of said systems being connected for response to the delayed video and the other for response to the undelayed video.

4. A scanner according to claim 2, in which said correlating means includes a cathode-ray oscilloscope with two mutually perpendicular deflection systems, sweep means connected to one of said systems and synchronized with scan action, and means including a high-speed switch alternately connecting the delay and the undelayed video signals to said other deflection system.

5. A scanner according to claim 4, in which said other deflection system includes means connecting one sampled video signal to said oscilloscope with a polarity opposite to that of the other video signal.

6. In an airborne scanner of the character indicated, two energy-responsive elements, optical means for imaging said elements beneath the aircraft in longitudinally spaced relation, means for causing the images of said elements to scan laterally of the flight axis, correlating means having two input channels, one of said channels being connected directly to the output of one of said elements, delay means connecting the other of said elements to the other of said channels, and means for varying the period of scan action; whereby, upon such variation until correlation is achieved, the velocity-altitude function of the aircraft may be determined.

7. In an airborne scanner of the character indicated, two energy-responsive elements, optical means for imaging said elements beneath the aircraft in longitudinally spaced relation, means for causing said elements to scan laterally of the flight axis, correlating means having two input channels, one of said channels being connected directly to the output of one of said elements, delay means connecting the other of said elements to the other of said channels, means synchronizing the delay of said delay means with the period of scan action, and means for selectively varying the period of scan action; whereby, upon such variation until correlation is achieved, the velocity-altitude function of the aircraft may be determined.

8. In an airborne scanner of the character indicated, two energy-responsive elements spaced in general alignment with the flight axis, optical means for causing the images of said elements to scan laterally of the flight axis, means including an endless loop of storage material synchronized with scan action for delaying the output of one of said elements by an amount representing the instantaneous period of the scanning cycle, correlating means responsive to the output of the other element and to the output of said delay means, and means for varying the periodicity of optical scan, whereby, upon adjustment of such periodicity of scan until correlation is achieved, the velocity-altitude function of the aircraft may be directly determined.

9. An aircraft-reconnaissance device, comprising a plurality of energy-responsive elements spaced in general alignment with the flight axis, optical means for causing said elements to scan laterally of the flight axis, reconnaissance-display and recording means responsive to the outputs of said elements and including means synchronized with scan action for creating an integrated display representing the combined video signals developed on a plurality of scans, means responsive to one of said elements and developing in a first channel a video signal directly representative of that developed by said one element, delay means responsive to other of said elements and developing a delayed-video signal in a second channel, correlating means responsive to signals in both said channels, and means for selectively varying the periodicity of scan by said optical means, whereby, upon adjustment to achieve the scan rate producing correlation, an optimum scan rate for the display of integrated intelligence may be inherently available.

10. The combination of claim 9, in which the display of said reconnaissance means and said correlation means both utilize the same cathode-ray oscilloscope, and selective-switching means on the one hand connecting said reconnaissance means for responsive exclusively to the video outputs of said energy-responsive elements and on the other hand connecting said channels to said one and to said other element, whereby, upon mere manipulation of said selective-switching means, an integrated display or a correlation display may be selectively available.

11. The combination according to claim 9, in which said reconnaissance means and said correlating means are both continuously connected to the outputs of said elements.

12. In an aircraft-reconnaissance device, two energy-responsive elements, a scanner including a plurality of like optical systems spaced about a scan axis passing through said elements, said optical system being oriented successively to image said elements beneath the aircraft and in longitudinally spaced relation, means including a variable-speed control for continuously rotating said scanner about said axis, a magnetic-storage drum synchronized with scanner rotation, a recording head in recording relation with said drum and responsive to the video output of one of said elements, a pick-up head spaced from said recording head in accordance with the angular separation of two of said optical systems, and correlating means responsive to the video output of the other of said elements and to the output of said pick-up head.

No references cited.